United States Patent
Mayer et al.

(10) Patent No.: US 10,494,876 B2
(45) Date of Patent: Dec. 3, 2019

(54) EARTH-BORING TOOLS INCLUDING ROTATABLE BEARING ELEMENTS AND RELATED METHODS

(71) Applicant: Baker Hughes, a GE company, LLC, Houston, TX (US)

(72) Inventors: Scott E. Mayer, Magnolia, TX (US); Juan Miguel Bilen, The Woodlands, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 95 days.

(21) Appl. No.: 15/668,474

(22) Filed: Aug. 3, 2017

(65) Prior Publication Data

US 2019/0040691 A1 Feb. 7, 2019

(51) Int. Cl.
| | |
|---|---|
| *E21B 12/00* | (2006.01) |
| *F16C 33/58* | (2006.01) |
| *F16F 15/023* | (2006.01) |
| *F16F 15/08* | (2006.01) |
| *F16F 15/06* | (2006.01) |
| *F16C 29/00* | (2006.01) |
| *F16C 29/04* | (2006.01) |

(52) U.S. Cl.
CPC ............ *E21B 12/00* (2013.01); *F16C 33/585* (2013.01); *F16C 29/002* (2013.01); *F16C 29/046* (2013.01); *F16C 2352/00* (2013.01); *F16F 15/023* (2013.01); *F16F 15/06* (2013.01); *F16F 15/08* (2013.01)

(58) Field of Classification Search
CPC .......... E21B 10/22; E21B 10/43; E21B 10/55; E21B 17/1057
See application file for complete search history.

(56) References Cited

U.S. PATENT DOCUMENTS

| | | | | |
|---|---|---|---|---|
| 4,553,795 A | * | 11/1985 | Takagi | .................. B30B 15/028 100/295 |
| 4,696,583 A | * | 9/1987 | Gorges | .................... B60B 33/08 16/26 |
| 5,213,168 A | * | 5/1993 | Warren | .................. E21B 7/062 175/61 |

(Continued)

OTHER PUBLICATIONS

International Written Opinion for International Application No. PCT/US2018/044798 dated Nov. 26, 2018, 6 pages.

(Continued)

*Primary Examiner* — Jennifer H Gay
(74) *Attorney, Agent, or Firm* — TraskBritt

(57) ABSTRACT

An earth-boring tool for drilling a subterranean formation includes a bit body having a central axis and a cavity extending into the bit body from an outer surface thereof. A bearing element assembly may be mounted within the cavity. The bearing element assembly comprises a lower retaining member, an upper retaining member mounted over to the lower retaining member, the upper retaining member comprising an aperture formed therethrough, and a spherical bearing element disposed over the lower retaining member and extending through the aperture formed through the upper retaining member. The spherical bearing element is rotatable about three axes of rotation within the lower retaining member and the upper retaining member.

19 Claims, 6 Drawing Sheets

(56) References Cited

U.S. PATENT DOCUMENTS

| | | | |
|---|---|---|---|
| 5,516,211 A * | 5/1996 | Barnes | B65G 39/025 |
| | | | 193/35 MD |
| 5,715,898 A * | 2/1998 | Anderson | E21B 17/1057 |
| | | | 175/323 |
| 6,142,250 A * | 11/2000 | Griffin | E21B 7/068 |
| | | | 175/381 |
| 7,971,662 B2 * | 7/2011 | Beuershausen | E21B 10/62 |
| | | | 175/408 |
| 8,011,307 B2 * | 9/2011 | Marcelli | B65G 39/025 |
| | | | 108/55.3 |
| 8,635,960 B2 * | 1/2014 | Iguchi | F16C 29/046 |
| | | | 108/139 |
| 9,399,892 B2 | 7/2016 | Do et al. | |
| 9,976,353 B2 * | 5/2018 | Hinz | E21B 10/43 |
| 10,066,444 B2 * | 9/2018 | Evans | E21B 7/00 |
| 2010/0163307 A1 | 7/2010 | Schwefe et al. | |
| 2010/0212964 A1 | 8/2010 | Beuershausen | |
| 2012/0255788 A1 * | 10/2012 | Schwefe | E21B 10/62 |
| | | | 175/61 |
| 2014/0262511 A1 | 9/2014 | Bilen | |
| 2014/0311801 A1 * | 10/2014 | Jain | E21B 10/62 |
| | | | 175/27 |
| 2014/0332283 A1 | 11/2014 | Do et al. | |
| 2015/0292268 A1 | 10/2015 | Oesterberg | |
| 2016/0053547 A1 * | 2/2016 | Samuel | E21B 10/00 |
| | | | 175/57 |
| 2016/0153243 A1 * | 6/2016 | Hinz | E21B 10/43 |
| | | | 175/57 |
| 2016/0273273 A1 * | 9/2016 | Hinz | E21B 10/43 |
| 2017/0175454 A1 | 6/2017 | Ricks et al. | |
| 2019/0040691 A1 * | 2/2019 | Mayer | E21B 12/00 |

OTHER PUBLICATIONS

International Search Report for International Application No. PCT/US2018/044798 dated Nov. 26, 2018, 4 pages.

* cited by examiner

EARTH-BORING TOOLS INCLUDING ROTATABLE BEARING ELEMENTS AND RELATED METHODS

TECHNICAL FIELD

The present disclosure, in various embodiments, relates generally to rotatable bearing elements, earth-boring tools including such rotatable bearing elements, and related methods.

BACKGROUND

Oil wells (wellbores) are usually drilled with a drill string. The drill string includes a tubular member having a drilling assembly that includes a single drill bit at its bottom end. The drilling assembly typically includes devices and sensors that provide information relating to a variety of parameters relating to the drilling operations ("drilling parameters"), behavior of the drilling assembly ("drilling assembly parameters") and parameters relating to the formations penetrated by the wellbore ("formation parameters"). A drill bit and/or reamer attached to the bottom end of the drilling assembly is rotated by rotating the drill string from the drilling rig and/or by a drilling motor (also referred to as a "mud motor") in the bottom hole assembly ("BHA") to remove formation material to drill the wellbore. A large number of wellbores are drilled along non-vertical, contoured trajectories in what is often referred to as directional drilling. For example, a single wellbore may include one or more vertical sections, deviated sections and horizontal sections extending through differing types of rock formations.

The drilling process causes significant wear on the each of the components of the drill string, in particular the drill bit and the BHA. Managing the wear and conditions that lead to premature failure of downhole components is a significant aspect in minimizing the time and cost of drilling a wellbore. Some of the conditions, often collectively referred to as "drilling dysfunctions," that may lead to premature wear and failure of the drill bit and the BHA include excessive torque, shocks, bit bounce, bit whirl, stick-slip, and others known in the art.

Bit whirl, for example, is characterized by a chaotic lateral translation of the drill bit and the BHA, frequently in a direction opposite to the direction of rotation. Whirl may cause high shocks to the bit and the downhole tools, leading to premature failure of the cutting structure of the bit. Whirl may be a result of several factors, including a poorly balanced drill bit, i.e., one that has an unintended imbalance in the lateral forces imposed on the bit during the drilling process, the cutting elements on the drill bit engaging the undrilled formation at a depth of cut too shallow to adequately provide enough force to stabilize the bit, and other factors known to those having ordinary skill in the art. Additionally, bit whirl may be caused in part by the cutting elements on the drill bit cutting too deeply into a formation, leading the bit to momentarily stop rotating, or stall. During this time, the drill pipe continues rotating, storing the torque within the drill string until the torque applied to the bit increases to the point at which the cutting elements break free in a violent fashion. Oscillation between such sticking and slipping at a relatively high frequency, which may manifest in the form of vibrations in the drill string, is a phenomenon is known in the art as "stick-slip."

When drilling with a fixed cutter, or so-called "drag" bit or other earth-boring tool progresses from a soft formation, such as sand, to a hard formation, such as shale, or vice versa, the rate of penetration ("ROP") changes, and excessive ROP fluctuations and/or vibrations (lateral or torsional) may be generated in the drill bit. The ROP is typically controlled by controlling the weight-on-bit ("WOB") and rotational speed (revolutions per minute or "RPM") of the drill bit. WOB is controlled by controlling the hook load at the surface and RPM is controlled by controlling the drill string rotation at the surface and/or by controlling the drilling motor speed in the drilling assembly. Controlling the drill bit vibrations and ROP by such methods requires the drilling system or operator to take actions at the surface. The impact of such surface actions on the drill bit fluctuations is not substantially immediate. Drill bit aggressiveness contributes to the vibration, whirl and stick-slip for a given WOB and drill bit rotational speed. "Depth of Cut" (DOC) of a fixed cutter drill bit, is generally defined as the depth to which a cutting element of a drag bit, for example, a polycrystalline diamond compact (PDC) cutting element, enters the formation being cut as the bit rotates, and may also be characterized by a distance a bit advances into a formation over a revolution, is a significant contributing factor relating to the drill bit aggressiveness, in conjunction with back rake of the cutting element. Controlling DOC can prevent excessive formation material buildup on the bit (e.g., "bit balling"), limit reactive torque to an acceptable level, enhance steerability and directional control of the bit, provide a smoother and more consistent diameter borehole, avoid premature damage to the cutting elements, and prolong operating life of the drill bit.

BRIEF SUMMARY

In some embodiments, an earth-boring tool for drilling a subterranean formation includes a bit body having a central axis and a cavity extending into the bit body from an outer surface thereof. A bearing element assembly may be mounted within the cavity. The bearing element assembly comprises a lower retaining member, an upper retaining member mounted over to the lower retaining member, the upper retaining member comprising an aperture formed therethrough, and a spherical bearing element disposed over the lower retaining member and extending through the aperture formed through the upper retaining member. The spherical bearing element is rotatable about three axes of rotation within the lower retaining member and the upper retaining member.

In other embodiments, a method of forming an earth-boring tool comprises providing a bit body having a cavity formed therein and mounting a bearing element assembly in the cavity. The cavity extends from an outer surface of the bit body partially into the bit body. The bearing element assembly comprises a lower retaining member, an upper retaining member disposed over and mounted to the lower retaining member, and a spherical bearing element disposed over the lower retaining member and extending through an aperture formed through the upper retaining member. The spherical bearing element is rotatable about three axes of rotation within the lower retaining member and the upper retaining member.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

Figure 1:
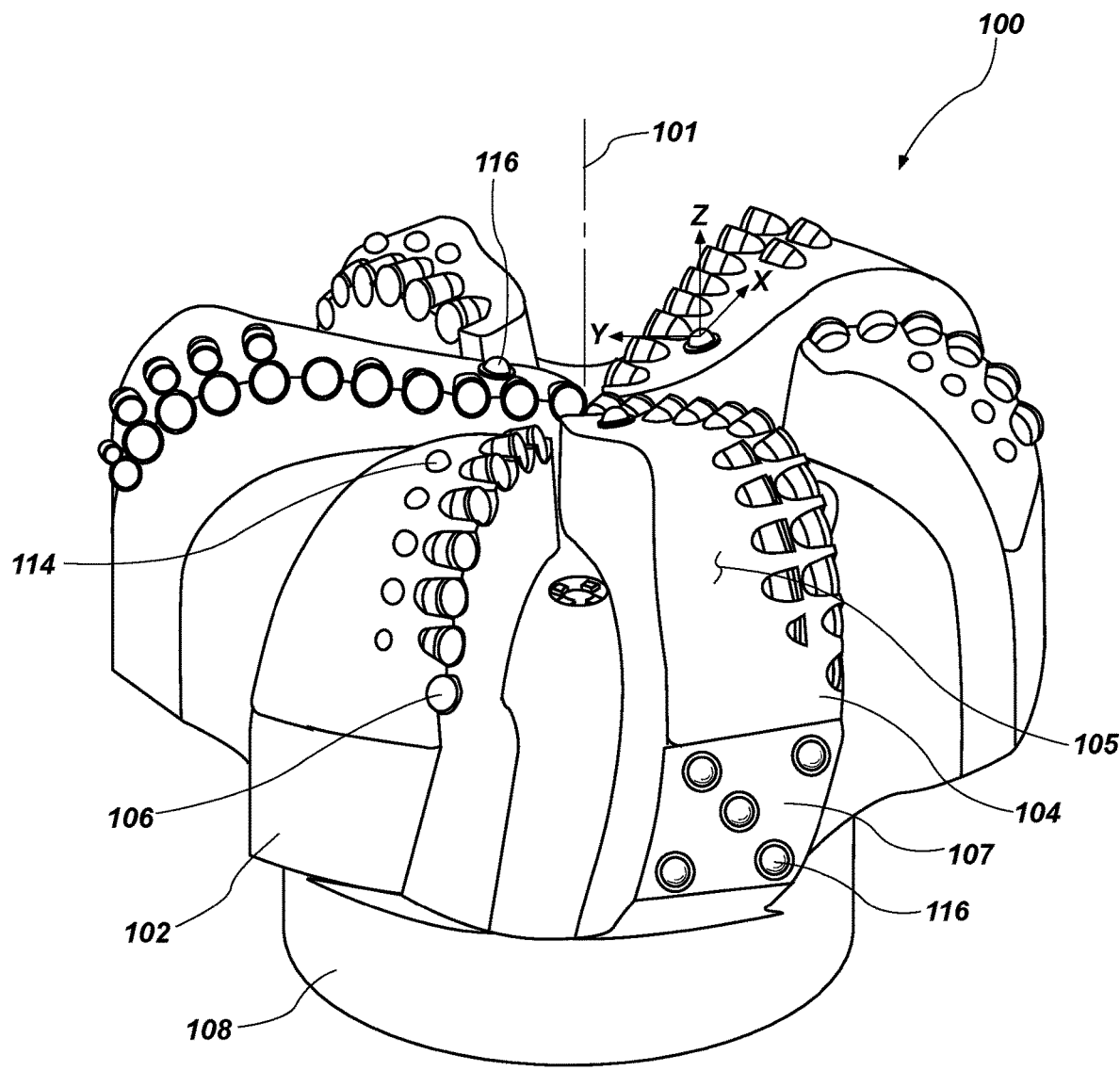
FIG. 1 illustrates a perspective view of an earth-boring tool in accordance with embodiments of the present disclosure.

The illustrations presented herein are not meant to be actual views of any particular cutting structure, drill bit, or component thereof, but are merely idealized representations which are employed to describe embodiments of the present disclosure. For clarity in description, various features and elements common among the embodiments may be referenced with the same or similar reference numerals.

As used herein, directional terms, such as "above," "below," "up," "down," "upward," "downward," "top," "bottom," "upper," "lower," "top-most", "bottom-most," and the like, are to be interpreted relative to the earth-boring tool or a component thereof in the orientation of the figures. In operation, the bit 100 illustrated in FIG. 1 would be inverted in a face-down orientation. Accordingly, FIGS. 1 and 3 through 9 are each illustrated in an inverted position from the normal face-down orientation during operation of the bit 100 while forming a wellbore in an earth formation.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other compatible materials, structures, features and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, the term "rotationally behind" means rotationally following a cutting element, but not necessarily following in the same path. For example, a bearing element described as located "rotationally behind" a cutting element on a blade means a bearing element that is located rotationally to the rear of the cutting element on the blade but may be located at the same or different radial distance from a central axis of the bit than a radial distance at which the cutting element is located on the blade such that the cutting element and the bearing element may have the same or different rotational path.

As used herein, the term "rotationally ahead" means rotationally leading a cutting element, but not necessarily following in the same path. For example, a bearing element described as located "rotationally ahead" a cutting element on a blade means a bearing element that is located rotationally forward of the cutting element on the blade but may be located at the same or different radial distance from a central axis of the bit than a radial distance at which the cutting element is located on the blade such that the cutting element and the bearing element may have the same or different rotational path.

As used herein, the term "earth-boring tool" means and includes any tool used to remove formation material and to form a bore (e.g., a wellbore) through a subterranean formation by way of the removal of the formation material. Earth-boring tools include, for example, rotary drill bits (e.g., fixed-cutter or "drag" bits and roller cone or "rock" bits), hybrid bits including both fixed cutters and roller elements, coring bits, percussion bits, bi-center bits, reamers (including expandable reamers and fixed-wing reamers), and other so-called "hole-opening" tools.

As used herein, the term "cutting element" means and includes any element of an earth-boring tool that is used to cut or otherwise disintegrate material of a subterranean formation when the earth-boring tool is used to form or enlarge a bore in the formation.

As used herein, the term "bearing element" means and includes any element of an earth-boring tool that is mounted to the tool and which is not configured to substantially cut or otherwise remove formation material when the earth-boring tool is used to form or enlarge a bore in the formation.

As used in this disclosure, the term "aggressiveness" ($\mu$) of an earth-boring tool is calculated according to the following formula:

$$\mu = \frac{36 \times T}{D \times W}$$

wherein T is the torque applied to the earth-boring tool, D is the diameter of the earth-boring tool, and W is the weight applied to the earth-boring tool (e.g., weight-on-bit (WOB)). Aggressiveness is a unitless number. Aggressiveness may be affected by factors such as vibration, number of blades or cones, cutting element size, type, back rake, side rake and configuration, hardness of the subterranean formation, frictional (e.g., rubbing) forces between cutting elements, bearing elements, and other components of the earth-boring tool and the formation being drilled, etc. These factors may affect the aggressiveness by changing the torque delivered at a particular applied weight. Different types of earth-boring tools may exhibit different aggressivenesses. As illustrative examples, conventional roller cone bits may have a bit aggressiveness of from about 0.10 to about 0.25, impregnated bits may have a bit aggressiveness of from about 0.12 to about 0.40, and fixed-cutter bits may have a bit aggressiveness of from about 0.40 to about 1.50 (assuming, in each case, similar cutting element type on each blade or roller cone of a bit, and somewhat evenly distributed applied weight between each blade or roller cone). Hybrid bits (bits having a combination of roller cones and fixed-cutter blades) may have a bit aggressiveness between that of a roller cone bit and a fixed-cutter drill bit.

Figure 2:
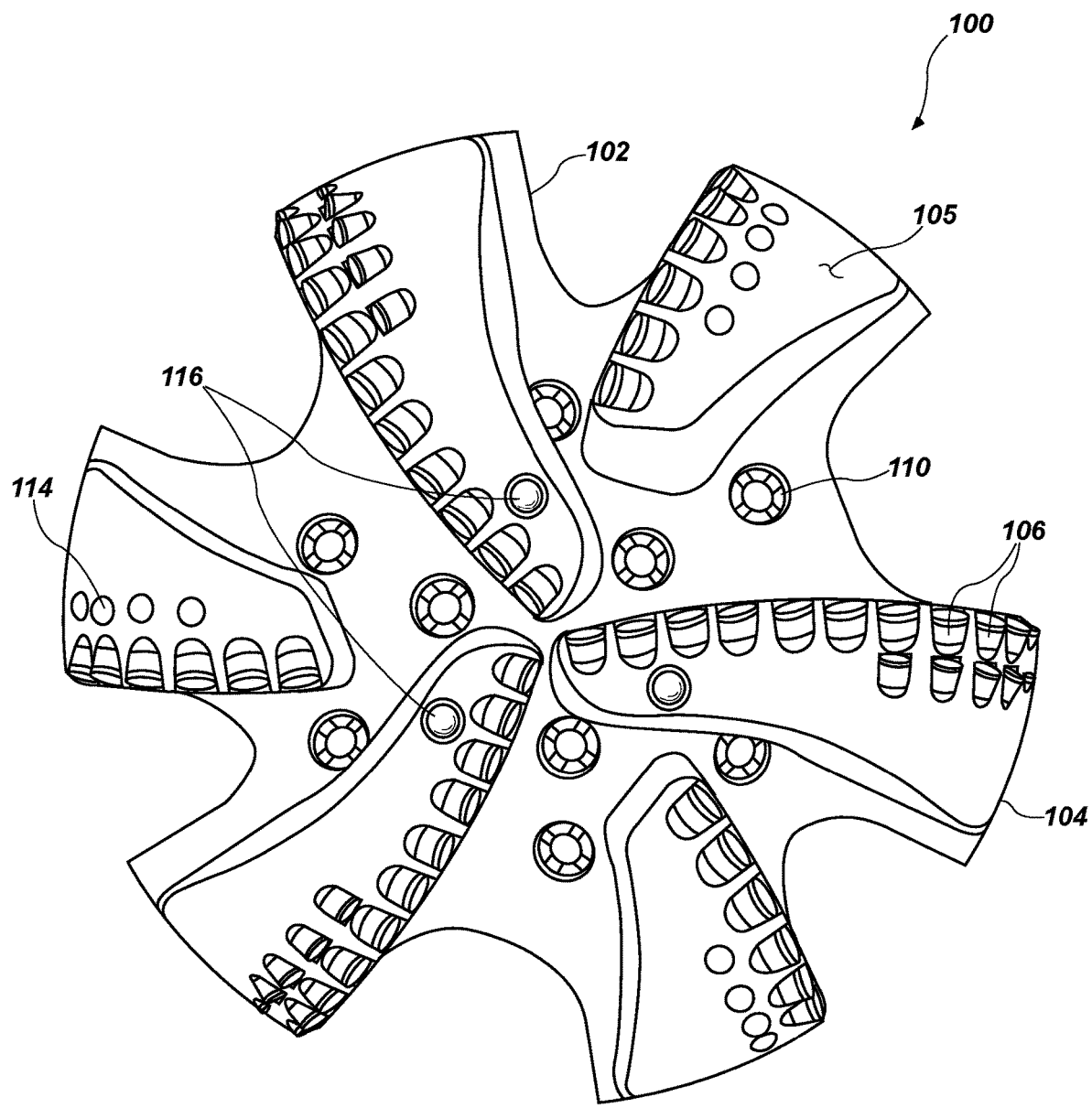
FIG. 2 illustrates a face view of the earth-boring tool of FIG. 1.

FIGS. 1 and 2 illustrate an example of a fixed-cutter earth-boring rotary drill bit 100 in a perspective view and a face view, respectively, in accordance with embodiments of the present disclosure. The drill bit 100 includes a bit body 102 having a central axis 101 about which the drill bit 100 rotates in operation. The bit body 102 comprises a plurality of blades 104 extending radially outward from proximate the central axis 101 toward a gage 107 of the bit body 102. In the embodiment of FIGS. 1 and 2, the bit body 102 has six blades 104, although in other embodiments the bit body 102 may have more or fewer blades 104. Outer surfaces of the blades 104 may define at least a portion of what is referred to in the art as the "face" of the drill bit 100 and the gage 107 of the drill bit 100. The face of the drill bit 100 is illustrated in FIG. 2.

A row of cutting elements 106 may be mounted to the blade 104 of the drill bit 100. For example, cutting element pockets may be formed in the blades 104, and the cutting elements 106 may be positioned in the cutting element pockets and bonded (e.g., brazed, welded, etc.) to the blades 104. The cutting elements 106 may comprise, for example, a polycrystalline compact in the form of a layer of hard polycrystalline material, also known in the art as a polycrystalline table, that is provided on (e.g., formed on or attached to) a supporting substrate with an interface therebetween. In some embodiments, the cutting elements 106 may comprise polycrystalline diamond compact (PDC) cutting elements each including a volume of polycrystalline diamond material provided on a ceramic-metal composite material substrate, as is known in the art. Though the cutting elements 106 in the embodiment depicted in FIG. 1 are cylindrical or disc-shaped, the cutting elements 106 may have any desirable shape, such as a dome, cone, chisel, etc.

The drill bit 100 includes a connection portion 108, which is commonly characterized as a "shank" and which may comprise, for example, a threaded pin connection conforming to specifications of the American Petroleum Institute (API) and configured for attachment to drill pipe or other component of a bottom hole assembly. In other embodiments, the drill bit 100 may comprise a casing bit configured to be attached to a section of wellbore casing or liner for drilling with the casing or liner.

The bit body 102 includes an inner plenum, access to which may be provided through the connection portion 108. Fluid passageways may extend from the inner plenum to fluid ports 110 at the face of the drill bit. During drilling, the drill bit 100 may be rotated at the bottom of the wellbore while drilling fluid is pumped through the bit body 102 and out of the fluid ports 110 (which may have fluid nozzles affixed therein to preferentially control fluid flow). The drilling fluid carries formation cuttings generated by the cutting elements 106 away from the cutting elements and up through the wellbore in the annulus between the drill string and the formation to the surface. The drilling fluid also may serve to cool the cutting elements 106 during drilling.

In embodiments, the bit body 102 may include bearing elements mounted thereon. One or more of the bearing elements may comprise stationary bearing elements 114. One or more of the bearing elements may comprise rotatable bearing elements 116 according to embodiments of the present disclosure. The bearing elements 114, 116 may be mounted on the blades 104. In some embodiments, the bearing elements 114, 116 may be located rotationally behind the cutting elements 106 mounted on respective blades 104. In other embodiments, the bearing elements 114, 116 may be located rotationally ahead of the cutting elements 106 mounted on respective blades 104. In yet other embodiments, the bearing elements 114, 116 may be located between one or more cutting elements 106 such that the bearing elements 114, 116 are neither rotationally behind nor rotationally ahead of the cutting elements 106.

The rotatable bearing elements 116 may be mounted on the face of the bit body 102. Within the face of the bit 100, the blade 104 may comprise a cone region, a nose region, and a shoulder region as known in the art. In FIGS. 1 and 2, the rotatable bearing elements 116 are illustrated as being mounted in the cone region of the face of the bit body 102. However, the rotatable bearing elements 116 may be mounted in one or more of the cone region, nose region, and shoulder region. The rotatable bearing elements 116 may also be mounted on the gage 107 of the bit body 102.

The rotatable bearing elements 116 have three rotational degrees of freedom such that the rotatable bearing elements 116 may rotate about one or more axes of rotation, including the x-axis, y-axis, and z-axis, simultaneously. The rotatable bearing element 116 may rotate freely about each rotational axis, optionally up to at least 360°, and preferably continuously through full 360° revolutions about each rotational axis. The stationary bearing elements 114 do not have any rotational degrees of freedom.

Figure 3:
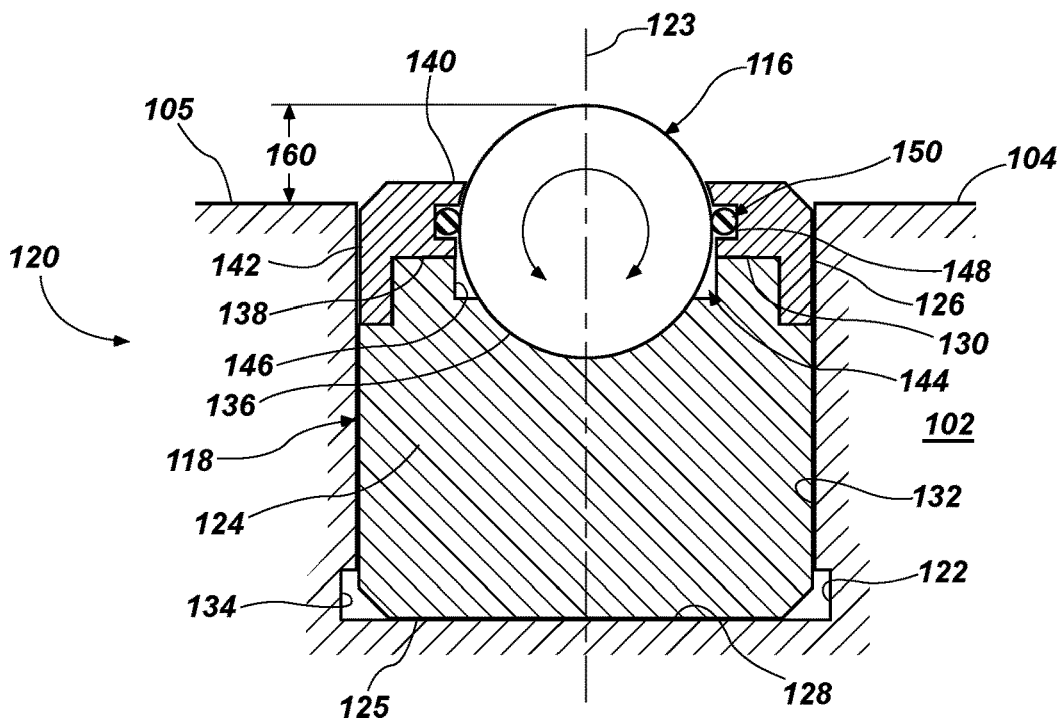
FIGS. 3 through 6 illustrate cross-sectional views of bearing element assemblies including rotatable bearing elements having three degrees of rotational freedom.

FIG. 3 illustrates a cross-sectional view of a rotatable bearing element assembly 120 including the rotatable bearing element 116. The rotatable bearing element assembly 120 may be received in a cavity 122 formed in the bit body 102 and, more particularly, formed in the blade 104. The cavity 122 comprises a central axis 123 extending normal to a lower surface 125 of the cavity 122. The z-axis of rotation of the rotatable bearing element 116 may be coaxial with the central axis 123 of the cavity 122.

The rotatable bearing element assembly 120 may include a housing 118 to retain the rotatable bearing element 116 such that the rotatable bearing element 116 may be fixed in position relative to the central axis 101 of the bit 100 while allowing the rotatable bearing element 116 to rotate about each rotational axis within the housing 118. In such embodiments, the rotatable bearing element 116 may be fixed at a given radial distance from the central axis 101 and may have a fixed position relative to the cutting elements 106 that may also be mounted on the blade 104.

The housing 118 includes a lower retaining member 124 and an upper retaining member 126. The lower retaining member 124 may comprise a lower surface 128, an upper surface 130, and a substantially cylindrical sidewall 132 extending therebetween. The lower surface 128 and the sidewall 132 may abut against inner surfaces 134 of the bit body 102 defining the cavity 122. The upper surface 130 of the lower retaining member 124 may comprise a recess 136 formed therein. The recess 136 may be a concave, curved surface and have a curvature that is complementary to a curvature of an outer surface of the rotatable bearing element 116 such that the recess 136 is sized and configured to abut against the rotatable bearing element 116 without hindering rotation of the rotatable bearing element 116. The upper retaining member 126 may be mounted over and coupled to the lower retaining member 124. In some embodiments, an interface at which the lower retaining member 124 and the upper retaining member 126 abut against one another may be nonlinear. The upper retaining member 126 may comprise a lower surface 138, an upper surface 140, and substantially cylindrical sidewall 142 extending therebetween. The upper retaining member 126 may further comprise a substantially cylindrical aperture 144 extending therethrough between the lower and upper surfaces 138, 140, and defined by an inner surface 146 of the upper retaining member 126. An annular recess 148 may be formed in the inner surface 146 of the upper retaining member 126. The annular recess 148 is sized and configured to receive a seal 150 therein.

The rotatable bearing element 116 comprises a spherical body or ball. The rotatable bearing element 116 may abut against the recess 136 and extend through the aperture 144 and over the upper surface 140. The rotatable bearing element 116 may have a circumference substantially equal in size to a circumference of the aperture 144 within the upper retaining member 126 such that the rotatable bearing element 116 may rotate within the aperture 144 without providing sufficient space between the rotatable bearing element 116 and the inner surface 146 of the upper retaining member 126 for debris generated by cutting action of the bit 100 to enter the housing 118. The seal 150 may also abut against the rotatable bearing element 116 to further inhibit debris generated during operation of the drill bit 100 from passing between the rotatable bearing element 116 and the upper retaining member 126. Such debris may interfere with the rotation of the rotatable bearing element 116.

The housing 118 and the rotatable bearing element 116 may be formed from wear resistant materials suitable for use in engaging the subterranean formation. In some embodiments, at least one of the housing 118 and the rotatable bearing element 116 may be formed of a metal or metal alloy, such as steel, or a ceramic material. In other embodiments, at least one of the housing 118 and the rotatable bearing element 116 may comprise or be coated with a diamond-impregnated material, a polycrystalline superhard material, such as polycrystalline diamond, diamond-like carbon and/or a tungsten carbide particle-matrix composite material. In yet other embodiments at least one of the housing 118 and the rotatable bearing element 116 may comprise a ceramic-metallic material (i.e., a cermet) such as cobalt-cemented tungsten carbide that may also include abrasive particles, such as diamond particles, dispersed therein.

Figure 4:
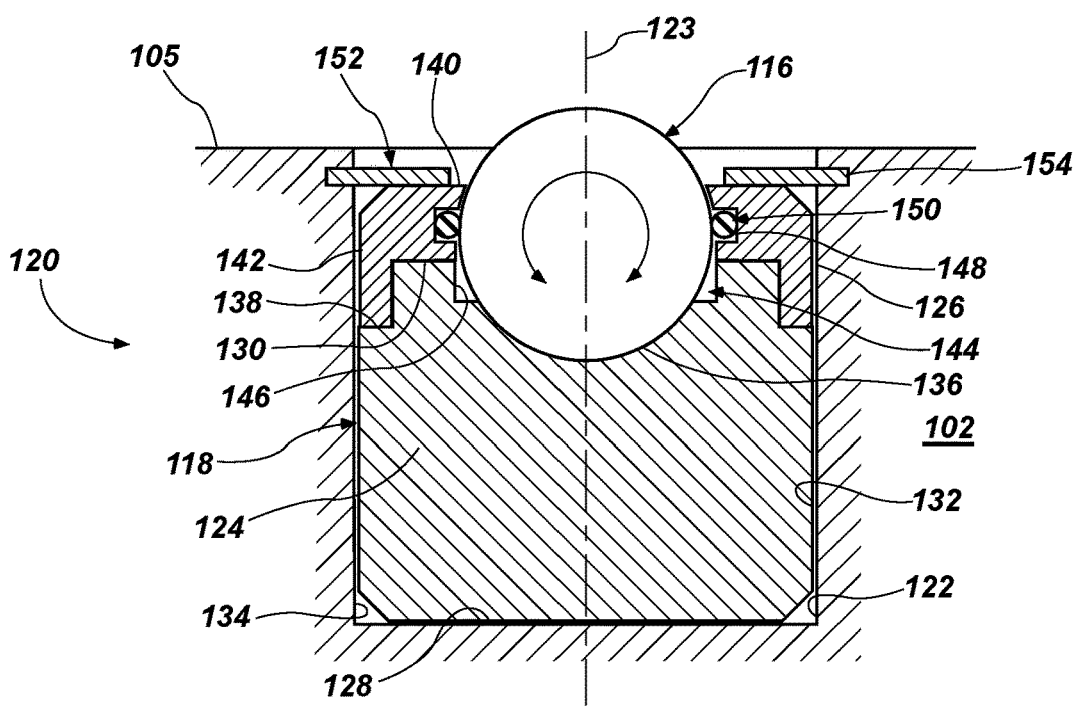

The housing 118 may be permanently or removably retained within the cavity 122. In some embodiments, the housing 118 may be retained within the cavity 122 by a threadless connection. As illustrated in FIG. 3, the housing 118 may be retained in the cavity 122 by press-fitting. In such embodiments, the sidewall 132 of the lower retaining member 124 and the inner surfaces 134 of the cavity 122 may be frictionally engaged to retain the rotatable bearing element assembly 120 within the bit body 102. In other embodiments and as illustrated in FIG. 4, the rotatable bearing element assembly 120 may be retained in the cavity 122 by a retainer ring 152. In such embodiments, an annular groove 154 may be formed into inner surfaces 134 of the cavity 122. The retainer ring 152 may be provided in the annular groove 154 and over the upper surface 140 of the upper retaining member 126. In other embodiments, the housing 118 may be retaining by welding, brazing, or adhesives.

Figure 5:
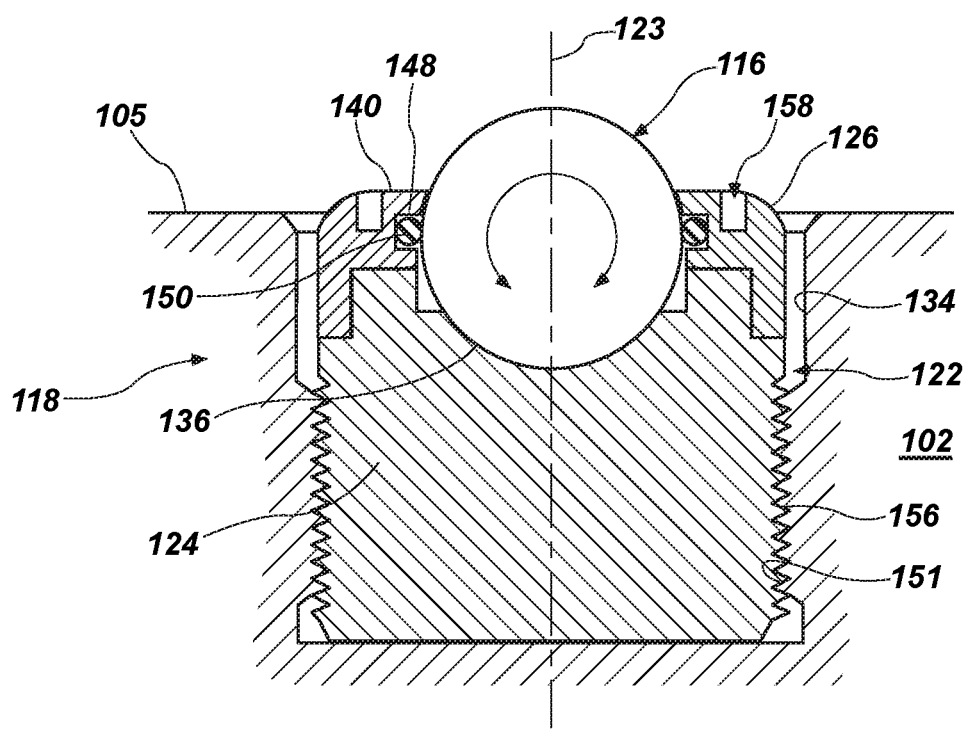

In yet other embodiments and as illustrated in FIG. 5, the housing 118 may be retained in the cavity 122 by a threaded connection. In such embodiments, the inner surface 134 of the cavity 122 may comprise internal threading 156 at least partially along a sidewall of the cavity 122 encircling the sidewall 132 of the lower retaining member 124. The lower retaining member 124 may comprise external threading 151 at least partially along the sidewall 132 thereof. The upper retaining member 126 may include an annular groove 158 extending into the upper surface 140 thereof. The annular groove 158 may be sized and configured for a tool to grip the housing 118 and rotate the housing 118 about a central axis thereof to engage the internal threading 156 and the external threading 151. In yet further embodiments, the housing 118 may be retaining in the cavity 122 by any convenient method including, but not limited to, rigid coupling elements, such as screws, bolts, and the like.

Figure 6:
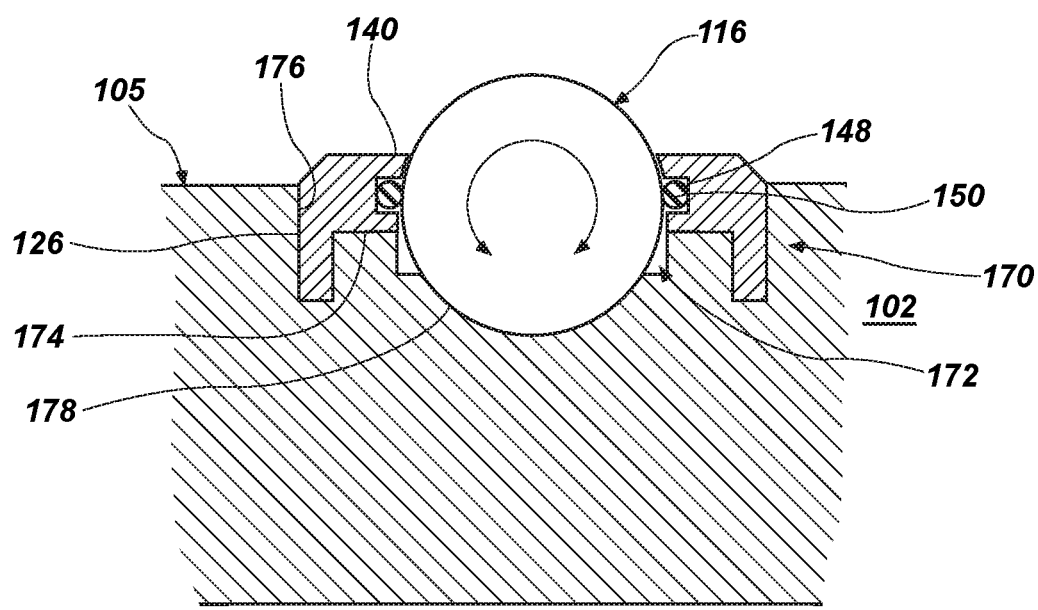

In yet further embodiments and as illustrated in FIG. 6, the rotatable bearing element 116 may be retained by a housing 170 including the upper retaining member 126 and lacking the lower retaining member 124. In such embodiments, the rotatable bearing element 116 and the upper retaining member 126 may be received in a cavity 172 formed in the bit body 102 and, more particularly, formed in the blade 104. Inner surfaces of the bit body 102 define a lower surface 174 and a substantially cylindrical sidewall 176 of the cavity 172. The lower surface 174 of the cavity 172 may comprise a recess 178. The recess 178 may be a concave, curved surface and have a curvature that is complementary to a curvature of an outer surface of the rotatable bearing element 116 such that the recess 178 is sized and configured to abut against the rotatable bearing element 116 without hindering rotation of the rotatable bearing element 116. As illustrated in FIG. 6, the upper retaining member 126 may be retained in the cavity 172 by a threadless connection as previously described with reference to FIG. 3. In other embodiments, the upper retaining member 126 may be retained in the cavity 172 by any of the retaining methods previously described with references to FIGS. 3 through 5.

In any of the foregoing embodiments, the rotatable bearing element 116 may extend at least partially above an adjacent outer surface of the bit body 102 and, more particularly, extend above and adjacent outer surface 105 of the blade 104. The distance by which a radially outermost surface of the rotatable bearing element 116 extends above the adjacent outer surface of the bit body 102 is referred to herein as the exposure 160. The radially outermost surface of the rotatable bearing element 116 is a point along the outer surface of the rotatable bearing element 116 coincident with the z-axis of the rotatable bearing element 116 at any given point as the rotatable bearing element 116 rotates within the housing 118. In some embodiments, the exposure 160 of the rotatable bearing element 116 may be coextensive with or less than an exposure of the cutting elements 106 on the bit body 102 and, more particularly, of cutting elements 106 on the same respective blade 104 on which the rotatable bearing element 116 is housed. In other embodiments, the rotatable bearing element 116 may be underexposed relative to the cutting elements 106 on the same respective blade 104 such that the exposure 160 of the rotatable bearing element 116 may be less than an exposure of the cutting elements 106. In yet other embodiments, the exposure of a plurality of rotatable bearing elements 116 may vary between one or more of the rotatable bearing elements 116 such that the exposure of the rotatable bearing elements 116 may vary between being underexposed and coextensive with the exposure of the cutting elements 106.

In operation, the rotatable bearing elements 116 mounted on the face of the bit 100 may be configured, for example, as a weight-on-cutting element limiting device configured to take on weight-on-bit when the rotatable bearing elements 116 are engaged with the subterranean formation and to limit the portion of the weight-on-bit taken on by the cutting elements 106 and/or as depth-of-cut control devices configured to limit the depth of cut of the cutting elements 106 and of the bit d100. The rotatable bearing elements 116 may also reduce axial vibrational forces applied on the bit 100 during whirl, stick-slips, etc., of the drill bit 100. The rotatable bearing elements 116 mounted on the gage 107 of the bit 100 may be configured to stabilize the bit 100 and to reduce lateral vibrational forces applied on the bit 100 during whirl, stick-slip, etc., of the drill bit 100. As the drill bit 100 rotates, the rotatable bearing elements 116 may engage with the subterranean formation and provide a bearing surface against which the subterranean formation may rub. Responsive to engagement with the subterranean formation and forces applied by the subterranean formation on the rotatable bearing elements 116, the rotatable bearing elements 116 may rotate about any of the three rotational axes. Compared to stationary bearing elements 114, the rotatable bearing elements 116 may exhibit a reduced amount of frictional force applied between the rotatable bearing elements 116 and the subterranean formation during operation of the bit 100. The reduced frictional forces between the rotatable bearing elements 116 and the subterranean formation as compared to stationary bearing elements 114, may provide weight-on-cutting element limiting devices, depth-of-cut-control devices, and gage pads that reduce axial and lateral vibrations experienced by the bit 100 during operation while having a minimal effect on the aggressiveness of the bit 100, which may be affected by frictional forces between the bit 100 and elements thereof and the subterranean formation.

Figure 7:
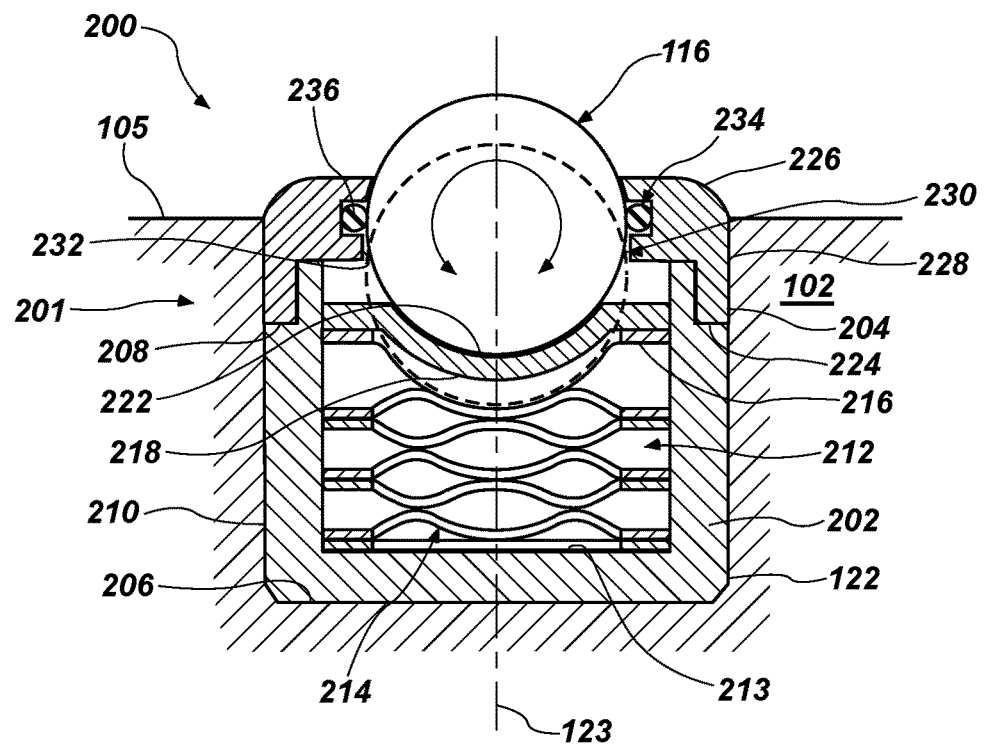
FIGS. 7 through 9 illustrate cross-sectional views of bearing element assemblies including rotatable bearing elements having three degrees of rotational freedom and one degree of translational freedom.
Figure 8:
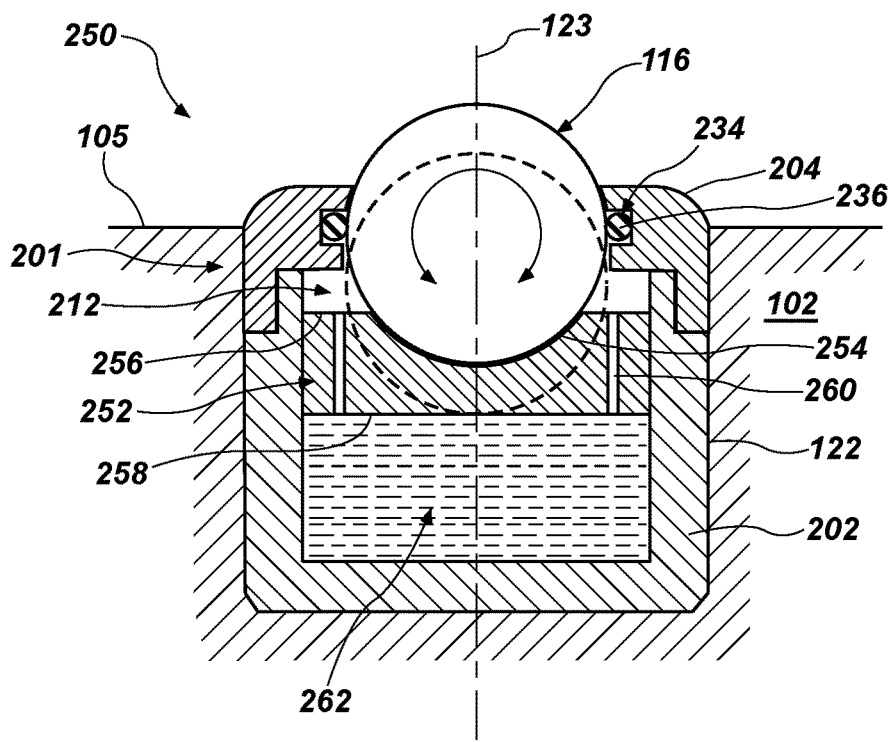
Figure 9:
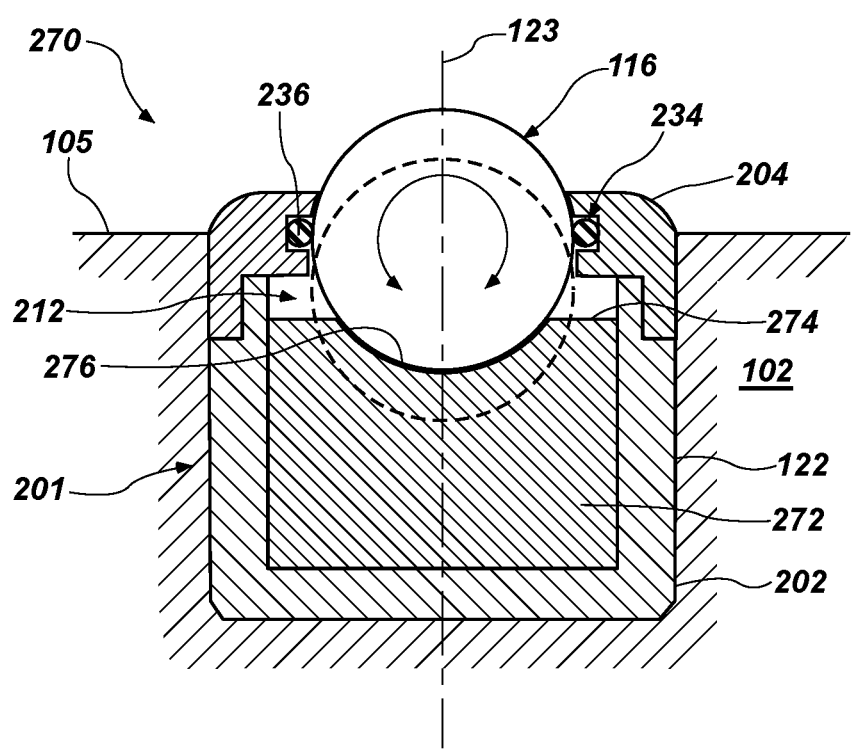

FIGS. 7 through 9 illustrate cross-sectional views of rotatable bearing element assemblies according to additional embodiments of the present disclosure. Like the rotatable bearing element assembly 120 previously described with regard to FIGS. 3 through 5, the rotatable bearing element 116 of the rotatable bearing element assemblies 200 may exhibit three rotational degrees of freedom. In addition, the rotatable bearing element 116 may also exhibit one translational degree of freedom. In such embodiments, the rotatable bearing element 116 may be movable along the z-axis such that the rotatable bearing element 116 may move along the central axis 123 of the cavity 122 in which the rotatable bearing element 116 is mounted. Accordingly, the rotatable bearing element 116 may extend above and retract with respect to the adjacent outer surface of the bit body 102 and, more particularly, the adjacent outer surface 105 of the blade 104.

The rotatable bearing element 116 may be adjustable between an extended position and a retracted position. With regard to FIGS. 7 through 9, the rotatable bearing element 116 is illustrated in dashed line to show the position of the rotatable bearing element 116 in the retracted position. The rotatable bearing element 116 is illustrated in solid line to show the position of the rotatable bearing element 116 in the extended position. The extended position of the rotatable bearing element 116 may be the default position, or the position at which the rotatable bearing element 116 rests when forces are not being applied thereto by the subterranean formation and the position to which the rotatable bearing element 116 returns are forces applied thereto by the subterranean formation are removed.

With reference to FIG. 7, the rotatable bearing element assembly 200 includes a housing 201 to retain the rotatable bearing element 116 such that the rotatable bearing element 116 may be fixed in position relative to the central axis 101 of the bit 100 while allowing the rotatable bearing element 116 to rotate about each rotational axis within the housing 201. The housing 201 may comprise a lower retaining member 202 and an upper retaining member 204. The lower retaining member 202 may comprise a lower surface 206, an upper surface 208, and a substantially cylindrical sidewall 210 extending therebetween. The lower retaining member 202 may further comprise a cavity 212 extending from the upper surface 208 and partially into the lower retaining member 202. The cavity 212 may be substantially cylindrical.

The upper retaining member 204 may comprise a lower surface 224, an upper surface 226, and substantially cylindrical sidewall 228 extending therebetween. The upper retaining member 204 may further comprise a substantially cylindrical aperture 230 extending therethrough between the lower and upper surfaces 224, 226 thereof and defined by inner surface 232 thereof. An annular recess 234 may be formed in the inner surface 232 of the upper retaining member 204. The annular recess 234 is sized and configured to receive a seal 236 therein.

The rotatable bearing element 116 may have a circumference substantially equal in size to a circumference of the aperture 230 within the upper retaining member 204 such that the rotatable bearing element 116 may rotate within the aperture 230 without providing sufficient space between the rotatable bearing element 116 and the inner surface 232 of the upper retaining member 204 for debris generated by cutting action of the bit 100 to enter the housing 201. The seal 236 may also abut against the rotatable bearing element 116 to further inhibit debris generated during operation of the drill bit 100 from passing between the rotatable bearing element 116 and the upper retaining member 204. Such debris may interfere with the rotation of the rotatable bearing element 116.

The rotatable bearing element assembly 200 may also comprise a damping element. As illustrated in FIG. 7, the damping element comprises at least one spring 214. In some embodiments, the spring 214 may be coupled at a first end to the lower retaining member 202 and at a second, opposite end to a support plate 216. More particularly, the spring 214 may be coupled to a bottom surface 213 of the cavity 212 and a bottom surface 218 of the support plate 216. The support plate 216 may include a recessed portion 222 relative to other portions of the support plate 216. The recessed portion 222 may be a concave, curved portion extending toward the bottom surface 213 of the cavity 212 and may have a curvature complementary to a curvature of an outer surface of the rotatable bearing element 116 such that the recessed portion 222 is sized and shaped to abut against an outer surface of the spherical rotatable bearing element 116 without hindering rotation of the rotatable bearing element 116.

In operation, the spring 214 biases the support plate 216 and the rotatable bearing element 116 to the extended position. When the rotatable bearing element 116 of the rotatable bearing element assembly 200 engages with the subterranean formation, the subterranean formation may apply a force against the rotatable bearing element 116 that exceeds the spring constant, k, of the spring 214 and compresses the spring 214 such that the rotatable bearing element 116 retracts from the outer surface 105 of the blade 104 and into the cavity 212 to the retracted position. When the force against the rotatable bearing element 116 is reduced and/or removed, the spring 214 and the support plate 216 may return to the extended position.

As illustrated in FIG. 7, the spring 214 includes a wave spring. In other embodiments, the spring 214 may comprise a helical spring, a coil spring, an elastomeric spring, a Belleville spring, and the like. In yet other embodiments, the damping element may include a plurality of springs 214 that may each be coupled to the lower retaining member 202 and the support plate 216 or may be coupled to each other to form a stack of springs 214. The spring 214 and the spring constant, k, thereof may be selected based on the anticipated weight-on-bit applied to the rotatable bearing element assembly 200, the anticipated hardness of the subterranean formation with which the rotatable bearing element 116 may engage, and other drilling parameters of the drill bit 100.

With reference to FIG. 8, a rotatable bearing element assembly 250 may comprise the rotatable bearing element 116 housed and rotatable within the lower retaining member 202 and upper retaining member 204. The rotatable bearing element assembly 250 may further comprise a support plate 252 having an upper surface 256 and a lower surface 258. The support plate 252 may be disposed in the cavity 212 of the lower retaining member 202. The upper surface 256 of the support plate 252 may have a recess 254 formed therein. At least one aperture 260 may be formed through the support plate 252 and extend between the upper surface 256 and the lower surface 258.

Like the rotatable bearing element assembly 200, the rotatable bearing element assembly 250 may also comprise a damping element. In the rotatable bearing element assembly 250, the damping element comprises a fluid 262. The fluid 262 may substantially fill a volume defined by inner surfaces of the cavity 212 and the lower surface 258 of the support plate 252. In some embodiments, the support plate 252 may be uncoupled from the lower retaining member 202, and the support plate 252 may float on a surface of the fluid 262. The fluid 262 may bias the support plate 252 and the rotatable bearing element 116 in the extended position.

In operation, the subterranean formation may apply a force against the rotatable bearing element 116, which force may be transferred to the support plate 252 abutting against the rotatable bearing element 116. The support plate 252 may apply the compressive force to the fluid 262. The fluid 262 may resist downward movement of the support plate 252 within the rotatable bearing element assembly 250 by virtue of the limited volume in which the fluid 262 is contained. Accordingly, some of the fluid 262 may flow through the apertures 260 in the support plate 252 to allow the rotatable bearing element 116 and the support plate 252 to be recessed from the outer surface 105 of the blade 104 in the retracted position. When the force against the rotatable bearing element 116 is reduced and/or removed, the support plate 252 may return to the extended position.

In some embodiments, the fluid 262 may comprise a Newtonian fluid. In other embodiments, the fluid 262 may comprise a non-Newtonian fluid. As non-Newtonian fluids may change their viscosity or flow behavior under stress, the non-Newtonian fluid may provide greater resistance against a rapid and sudden application of stress and a lesser resistance against a slow and continuous application of stress.

With reference to FIG. 9, a rotatable bearing element assembly 270 may comprise the rotatable bearing element 116 housed and rotatable within the lower retaining member 202 and the upper retaining member 204. Like the rotatable bearing element assemblies 200, 250, the rotatable bearing element assembly 270 may also comprise a damping element. The damping element may comprise a support body 272 formed of an elastically deformable material. In some embodiments, the support body 272 may comprise high density rubber or a polyurethane. The support body 272 may substantially fill a volume of the cavity 212 of the lower retaining member 202. An upper surface 274 of the support body 272 may comprise a recess 276. The recess 276 may be a concave, curved surface and have a curvature that is complementary to a curvature of an outer surface of the rotatable bearing element 116 such that the recess 276 is sized and configured to abut against the rotatable bearing element 116 without hindering rotation of the rotatable bearing element 116.

In operation, the subterranean formation may apply a force against the rotatable bearing element 116, which force may be transferred to the support body 272 abutting against the rotatable bearing element 116. The support body 272 may be compressed by the force applied by the rotatable bearing element 116 thereon while also providing resistance to the downward movement of the rotatable bearing element 116 within the rotatable bearing element assembly 270. When the force against the rotatable bearing element 116 is reduced and/or removed, the support body 272 may return an expanded form and return the rotatable bearing element 116 to the extended position.

In any of the foregoing embodiments, the rotatable bearing element assemblies 200, 250, 270 may be mounted within the cavity 122 of the bit body 102 by any of the methods previously described with regard to the housing of the rotatable bearing element assembly 120 of FIGS. 3 through 5. Similarly, the housing 201 of the rotatable bearing element assemblies 200, 250, 270, including the lower retaining member 202 and upper retaining member 204, may be formed of any of the materials previously described with regard to the housing 118 of the rotatable bearing element assembly 120, including the lower retaining member 124 and upper retaining member 126.

In any of the foregoing embodiments, a wear resistant and/or low friction coating may be provided between the rotatable bearing element 116 and the surface against which the rotatable bearing element 116 rotates. For instance, in any of the embodiments of FIGS. 3 through 5, the coating may be provided on the upper surface 130 of the lower retaining member 124 and, more particularly, within the recess 136 of the upper surface 130, in the embodiment of FIG. 6, the coating may be provided on the lower surface 174 of the cavity 172 and, more particularly, within the recess 178 of the lower surface 174, and in the embodiments of FIGS. 7 through 9, the coating may be provided on the support plate 216, the support plate 252, and the support body 272. By way of example and not limitation, the coating may comprise a tungsten carbide material and/or diamond-like materials, such as diamond-like carbon. In some embodiments, the coating may also include wear-resistant additives such as molybdenum disulfide and/or tungsten disulfide.

As previously described here, in operation, the rotatable bearing elements 116 mounted on the face of the bit 100 may be configured, for example, as weight-on-bit control devices configured to modify the weight-on-bit applied to cutting elements 106 and/or as depth-of-cut control devices configured to modify the depth of cut of the cutting elements 106 and of the bit 100 and may reduce axial vibrational forces applied on the bit 100 during whirl, stick-slips, etc. of the drill bit 100. The rotatable bearing elements 116 mounted on the gage 107 of the bit 100 may be configured to stabilize the bit 100 and lateral vibrational forces applied on the bit 100 during whirl, stick-slip, etc. of the drill bit 100. As compared to stationary bearing elements 114, the rotatable bearing elements 116 may exhibit a reduced amount of frictional force applied between the rotatable bearing elements 116 and the subterranean formation during operation of the bit 100. The reduced frictional forces between the rotatable bearing elements 116 and the subterranean formation as compared to stationary bearing elements 114, may provide weight-on-cutting element limiting devices, depth-of-cut-control devices, and gage pads that reduce axial and lateral vibrations experienced by the bit 100 during operation and that have a minimal effect on the aggressiveness of the bit 100, which may be affected by frictional forces between the bit 100 and elements thereof and the subterranean formation. As compared to the rotatable bearing element assembly 120, the damping elements of the rotatable bearing element assemblies 200, 250, 270, which also allow for translational movement of the rotatable bearing elements 116, may dampen axial and lateral vibrations experienced by the bit 100 during operation thereof. Accordingly, drill bits 100 having rotatable bearing elements 116 housed in rotatable bearing element assemblies 120, 200, 250, 270 according to embodiments of the present disclosure may have a prolonged operating life compared to drill bits lacking such assemblies due to the reduced frictional forces applied between the rotatable bearing elements 116 and the subterranean formation compared to stationary bearing elements 114, the stabilization provided to the bit 100 by the rotatable bearing element assemblies 120, 200, 250, 270, and by damping effect provided by the damping elements of the rotatable bearing element assemblies 120, 200, 250, 270 disclosed herein.

While the disclosed structures and methods are susceptible to various modifications and alternative forms in implementation thereof, specific embodiments have been shown by way of example in the drawings and have been described in detail herein. However, it should be understood that the present disclosure is not limited to the particular forms disclosed. Rather, the present invention encompasses all modifications, combinations, equivalents, variations, and alternatives falling within the scope of the present disclosure as defined by the following appended claims and their legal equivalents.

What is claimed is:

1. An earth-boring tool for drilling a subterranean formation, comprising:
    a body having a central axis and a cavity extending into the body from an outer surface thereof, the cavity having a central axis extending therethrough;
    at least one cutting element mounted on the body; and
    a bearing element assembly mounted within the cavity, the bearing element assembly comprising:
        a lower retaining member;
        an upper retaining member mounted over the lower retaining member, the upper retaining member comprising an aperture formed therethrough;
        a spherical bearing element disposed over the lower retaining member and extending through the aperture formed through the upper retaining member, the spherical bearing element being rotatable about three axes of rotation and being axially translatable along the central axis of the cavity within the lower retaining member and the upper retaining member; and
        a support structure disposed within the lower retaining member, the support structure having a surface configured for rotation of the spherical bearing element thereon, the support structure being axially translatable with the spherical bearing element along the central axis of the cavity;
    wherein the bearing element assembly is located and configured such that the spherical bearing element is underexposed relative to the at least one cutting element mounted on the body.

2. The earth-boring tool of claim 1, wherein the spherical bearing element is located on the body for rotation about at least one rotational axis of the three axes of rotation responsive to the spherical bearing element contacting a subterranean formation.

3. The earth-boring tool of claim 1, wherein:
    the cavity has a lower surface recessed relative to the outer surface of the body and a substantially cylindrical sidewall.

4. The earth-boring tool of claim 3, wherein the lower retaining member comprises a cavity extending partially therethrough from an upper surface thereof, and wherein the support structure is disposed within the cavity of the lower retaining member.

5. The earth-boring tool of claim 4, wherein the lower retaining member comprises a damping element disposed in the cavity thereof, the damping element configured to dampen a force applied by the subterranean formation on the spherical bearing element.

6. The earth-boring tool of claim 5, wherein the damping element comprises a spring, the damping element coupled to the support structure.

7. The earth-boring tool of claim 5, wherein the damping element comprises a non-Newtonian fluid, the non-Newtonian fluid disposed in a space between the lower retaining member and a surface of the support structure opposite the surface on which the spherical bearing element rotates.

8. The earth-boring tool of claim 1, wherein the support structure comprises an elastically deformable material and is configured to dampen a force applied by the subterranean formation on the spherical bearing element.

9. The earth-boring tool of claim 1, wherein the bearing element assembly is mounted rotationally behind the at least one cutting element on the body.

10. The earth-boring tool of claim 1, wherein the bearing element assembly is mounted on a face of the body and configured as a weight-on-cutting element limiting feature or a depth-of-cut control feature.

11. The earth-boring tool of claim 1, wherein the bearing element assembly is mounted on a gage of the body and configured to reduce lateral vibrations of the earth-boring tool.

12. A method of forming an earth-boring tool, comprising:
    providing a body having a cavity formed therein, the cavity extending from an outer surface of the body partially into the body, the cavity having a central axis extending therethrough;
    mounting a bearing element assembly in the cavity, the bearing element assembly comprising:
        a lower retaining member;
        an upper retaining member disposed over and mounted to the lower retaining member;
        a spherical bearing element disposed over the lower retaining member and extending through an aperture formed through the upper retaining member, the spherical bearing element being rotatable about three axes of rotation and being axially translatable along the central axis of the cavity within the lower retaining member and the upper retaining member; and a support structure disposed within the lower retaining member, the support structure having a surface configured for rotation of the spherical bearing element thereon, the support structure being axially translatable with the spherical bearing element along the central axis of the cavity; and mounting at least one cutting element to the body such that the bearing element assembly is underexposed relative to the at least one cutting element.

13. The method of claim 12, wherein mounting the bearing element assembly in the cavity comprises mounting the bearing element assembly in the cavity by a threadless connection.

14. The method of claim 13, wherein mounting the bearing element assembly in the cavity comprises mounting the bearing element assembly in the cavity by one of press-fitting, welding, brazing, and a retaining ring.

15. The method of claim 12, wherein mounting the bearing element assembly in the cavity comprises mounting the bearing element assembly in the cavity by a threaded connection, wherein the lower retaining member comprises threading about a sidewall thereof and the cavity comprises threading about a sidewall thereof, the sidewall of the cavity encircling the sidewall of the lower retaining member.

16. The method of claim 12, further comprising:
selecting the lower retaining member to comprise a cavity extending partially therethrough; and
providing a damping element within the cavity of the lower retaining member such that the spherical bearing element is disposed over the damping element and is axially translatable.

17. The method of claim 16, further comprising selecting the damping element to comprise a fluid or a spring.

18. The method of claim 12, wherein mounting the bearing element assembly in the cavity comprises mounting the bearing element assembly in a cavity formed in a gage of the body, the bearing element assembly configured to reduce lateral vibrations of the body.

19. The method of claim 12, wherein mounting the bearing element assembly in the cavity comprises mounting the bearing element assembly in a cavity formed in a face of the body rotationally behind at least one cutting element mounted to the body, the bearing element assembly configured as a one of a weight-on-cutting element limiting feature and a depth-of-cut control feature.

\* \* \* \* \*